Aug. 22, 1933.  E. PATTERSON  1,923,391
HARVESTER
Filed April 20, 1931  2 Sheets-Sheet 1
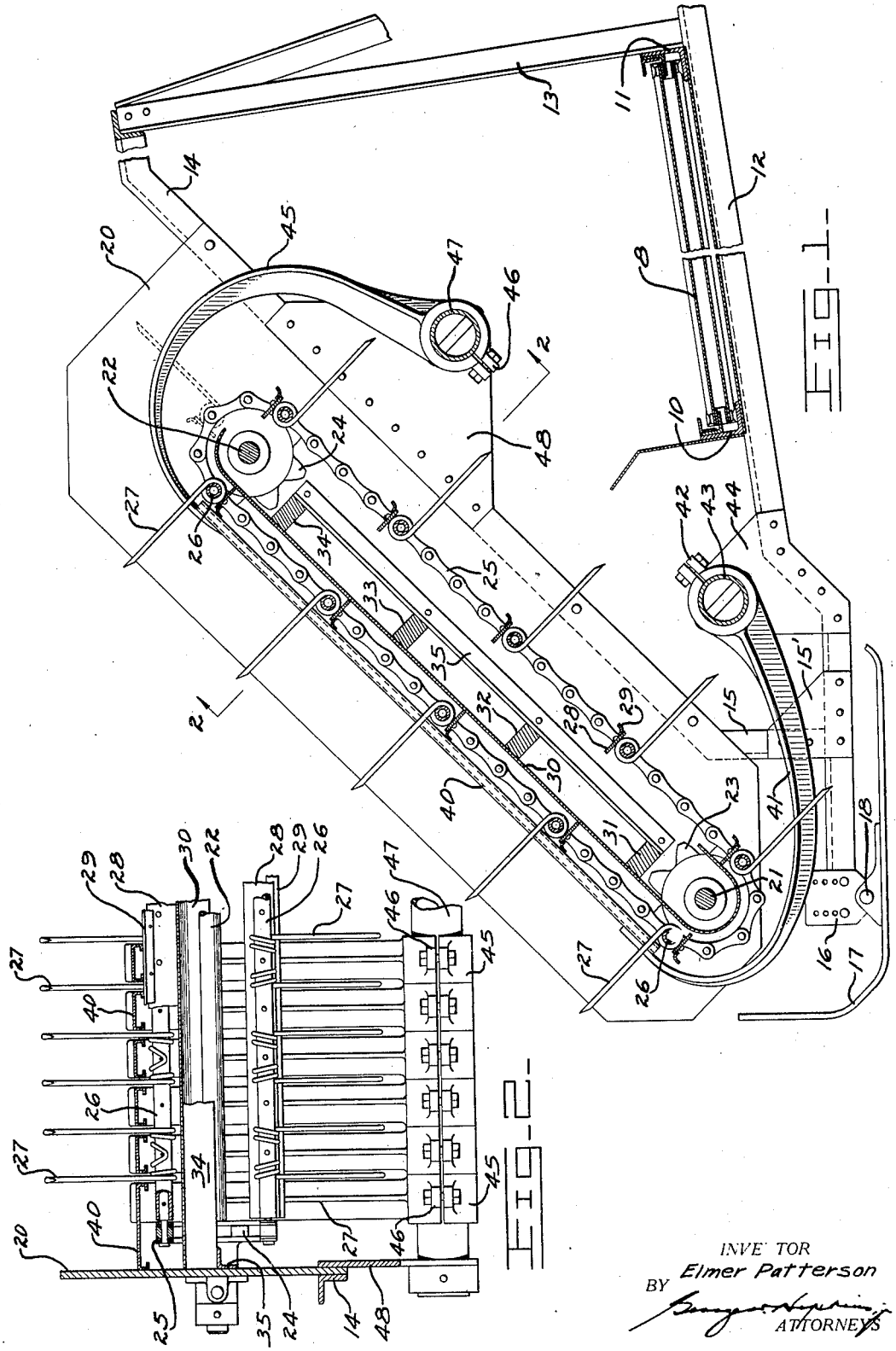
INVENTOR
Elmer Patterson
BY
ATTORNEYS

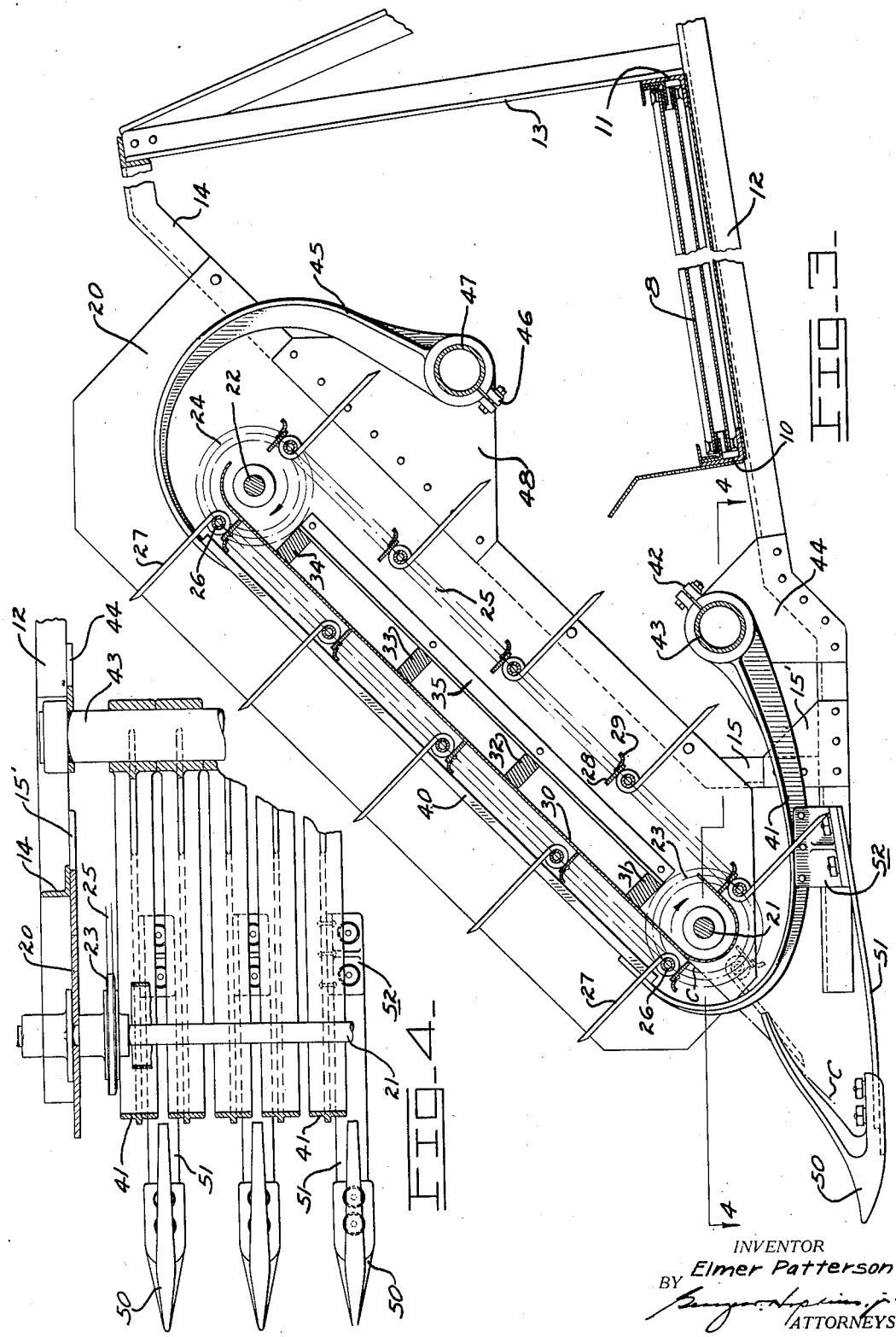

Patented Aug. 22, 1933

1,923,391

UNITED STATES PATENT OFFICE 1,923,391

HARVESTER

Elmer Patterson, San Leandro, Calif., assignor to Caterpillar Tractor Co., San Leandro, Calif., a Corporation of California Application April 20, 1931. Serial No. 531,420

22 Claims. (Cl. 56—364)

Statement of invention

The invention relates to harvesters, and particularly to pick-up mechanism.

The objects of the invention are, first: to provide an improved pick-up mechanism; second: to provide a pick-up mechanism which includes an endless chain of tang bars with means to facilitate engagement and disengagement of the tangs with the material.

Description of figures

Fig. 1 is a sectional view of the pick-up.
Fig. 2 is a section on line 2—2 of Fig. 1.
Fig. 3 is a sectional view of a modification.
Fig. 4 is a section on line 4—4 of Fig. 3.

Description of mechanism

The pick-up mechanism is mounted on a framework which is usually balanced on an axle having a ground wheel and a connection to the side of a threshing machine, by means of which the pick-up unit is propelled over the field. The pick-up picks up material from the field and feeds it to the threshing machine. For this purpose, the pick-up is provided with draper 8 which is suitably supported in the framework by angles 10, 11 which are supported on bars 12. Uprights 13 are secured to the bars 12, and bars 14 are secured to the upper ends of uprights 13 and extend forwardly, converging toward bars 12. The lower ends are bent downwardly at 15 to join the bars 12 by gusset plate 15'.

The forward end of bar 12 is provided with an adjustable plate 16 to which runner 17 is pivoted at 18. Runner 17 is adapted to contact the ground.

Side plates 20 are secured to the bars 14, and shafts 21, 22 have their ends journaled in side plates 20. The draper 8 and shaft 22 are driven in the usual manner. Sprockets 23, 24 are secured to shafts 21, 22, respectively, and endless chains 25 encompass sprockets 23, 24. Tang bars 26 have their ends mounted in chains 25 and tangs 27 are secured to tang bars 26. Wipers 28 and 29 are secured to tang bars 26 and extend substantially the length thereof. Wipers 28 are adapted to wipe over centerboard 30 which is supported on cross members 31, 32, 33, 34 which are secured to angles 35 fastened to side plates 20. Any kernels which become dislodged from the grain as it is carried upwardly by the pick-up, drop on centerboard 30 and are carried therealong by wipers 28 to be deposited on draper 8. Wipers 29 wipe the under sides of strips 40 which are positioned between the rows of tangs 27 and are sufficiently spaced from centerboard 30 to permit tang bars 26 to move freely thereunder. The lower ends of strips 40 are secured to curved arms 41 which are provided with a clamping hub 42 for securing to a tube 43, the ends of which are supported in plates 44 secured to frame bars 12. The upper ends of strips 40 are secured to similar curved arms 45, which are provided with clamping hubs 46 for securing to tube 47, the ends of which are supported in plates 48, secured to bars 14. As the tangs round the upper turn, curved arms 45 serve to disengage the material by stripping it therefrom, there being just sufficient space between the edges of the curved arms to permit the tangs to pass freely therebetween. As illustrated by the dotted line position of the tangs in Fig. 1, due to the curvature of the curved arms 45, the grain is raised off the tangs as they round the turn, the grain sliding over the curved arms 45 and dropping on the draper 8 which transports the grain into the feeder house of the threshing machine.

In the embodiment illustrated in Figs. 3 and 4, pick-up guards 50 are secured to the outer ends of flexible strips 51 which are secured to brackets 52 attached to the lower arms 41. The pick-up guards serve to lift the material from the ground up to the plane of the centerboard 30 which is indicated by the dot and dash line C—C, at which point the material is engaged by the tangs as illustrated by the dotted line position in Fig. 3.

This construction is particularly desirable in picking up grains in which the kernels are easily dislodged, and also in the case of beans, the pods of which are easily shaken off. In handling grains of this type, the rapid wiping action of the tangs adjacent the ground has a tendency to kick the material forwardly over the field instead of picking it up. By using the guards 50, the material is first elevated into the plane of the centerboard and then the tangs engage the material after the tangs are in the plane of the centerboard. At this time the under angle between the tangs and the guards is substantially 180 degrees. It will be apparent that as long as the under angle is substantially 180 degrees or less at the time the tangs reach the guards so as to lift the material therefrom, the tangs will not exert any kicking action on the material.

I, therefore, claim as my invention:

1. In a pick-up, a draper, a movable endless chain of tang bars over which material is transported, tangs on said bars, and stationary means cooperating with said tangs to facilitate transportation of material by said tangs and disengagement of material therefrom.

2. In a pick-up, a frame, a draper on said frame, a movable endless chain of tang bars, a centerboard supported on said frame, wipers on said bars contacting said centerboard, tangs on said bars, a plurality of strips between said tangs, and means including curved arms to support said strips.

3. In a pick-up, a movable endless chain of tang bars, tangs on said bars, wipers on said bars, and stationary means cooperating with said tangs and said wipers to facilitate transportation of material by said chain and discharge of material therefrom.

4. In a pick-up, a movable endless chain of tang bars, tangs thereon, wipers on said bars, a centerboard adapted to be contacted by said wipers, a plurality of guards adapted to elevate material from the ground into the plane of said centerboard for engagement by said tangs.

5. In a pick-up, a frame, a movable endless chain of tang bars having tangs and wipers thereon, a centerboard mounted in said frame and adapted to be contacted by said wipers, strips between said tangs adapted to be contacted by said wipers, upper and lower arms secured to said frame to support said strips above said centerboard, and guards attached to said lower arms and adapted to elevate material into the plane of said centerboard for engagement by said tangs.

6. In a pick-up, a movable endless conveyor having a plurality of reaches, a plurality of tangs mounted for movement with said conveyor and means terminating adjacent the end of one reach of the conveyor for both supporting material thereon and stripping material from the tangs as they travel to the other reach of the conveyor.

7. In a pick-up, a movable endless conveyor having an upper conveying reach and a lower return reach, means for moving the conveyor to transport material along the upper reach, a plurality of tangs mounted for movement with said conveyor and a stationary member terminating adjacent the end of the upper reach of the conveyor for stripping material from the tangs as they travel to the under reach of the conveyor.

8. In a pick-up, a movable endless conveyor having a plurality of reaches, a plurality of tangs mounted for movement with said conveyor, and a curved member terminating adjacent the end of one reach of the conveyor for stripping material from the tangs as they travel to the other reach of the conveyor, said member having a portion continuing said one reach of the conveyor to support material thereon.

9. In a pick-up, a movable endless conveyor having an upper reach and a lower reach, means including tangs mounted for movement with said conveyor for effecting transportation of material over the upper reach, and stripping means adjacent an end of the upper reach for effecting disengagement of the material from the tangs.

10. In a pick-up, a movable endless conveyor having an upper reach and a lower reach, a plurality of tangs mounted for movement with said conveyor, strips mounted between said tangs and over the upper reach to provide a surface on which material is transported, and stripping means associated with said strips.

11. In a pick-up, a movable endless conveyor having an upper reach and a lower reach, a plurality of tangs mounted for movement with said conveyor, strips mounted between said tangs and over the upper reach to provide a surface on which material is transported, and curved members connected with opposite ends of said strips.

12. In a pick-up, a movable endless conveyor a plurality of tangs mounted for movement with said conveyor, and a member for elevating material from the ground onto the tangs, the member being positioned to provide an upper surface substantially parallel to the conveyor.

13. In a pick-up, a movable endless conveyor, a plurality of tangs mounted for movement with said conveyor, and a member for elevating material from the ground onto the tangs, the member being so positioned that its upper surface forms substantially a straight angle with the tangs at the position where material is delivered therefrom onto the tangs.

14. In a pick-up, a movable endless conveyor, a plurality of tangs mounted for movement with said conveyor, and a member for elevating material from the ground onto the tangs, the member being so positioned with respect to the tangs that at the position where the tangs reach the member in their movement with the chain, material is picked up and not kicked by the tangs.

15. In a pick-up, a movable endless conveyor, a plurality of tangs mounted for movement with said conveyor, a member for elevating material onto the tangs, and means for mounting the tangs and member so that the under-angle which the tangs make with the member at the position where the tangs reach the member in their movement with the chain, is not more than substantially 180 degrees.

16. In a pick-up, an endless conveyor, a plurality of rows of tangs mounted for movement with said conveyor, and strips in the spaces between the rows of said tangs, said strips being positioned between the ends of said tangs and said conveyor to provide a supporting surface for material conveyed.

17. In a pick-up, an endless conveyor having an upper conveying reach and a lower return reach, a plurality of tangs mounted for movement with said conveyor, and strips between said tangs, said strips being positioned above said upper reach to provide a supporting surface for material conveyed.

18. In a pick-up, an endless conveyor having an upper conveying reach and a lower return reach, a plurality of tangs mounted for movement with said conveyor, strips above said upper reach and between said tanks to provide a supporting surface for material conveyed, and material stripping members connected with said strips.

19. In a pick-up, an endless conveyor having an upper conveying reach and a lower return reach, a plurality of tangs mounted for movement with said conveyor, strips above said upper reach and between said tangs to provide a supporting surface for material conveyed, a centerboard below said upper reach and the strips, and wipers connected for movement with said conveyor and positioned between said centerboard and said strips.

20. In a pick-up, an endless conveyor having an upper conveying reach, a lower return reach and a discharge turn, a plurality of tangs mounted for movement with said conveyor, and stationary stripping members substantially continuing the upper conveying reach at the discharge turn to remove material from the tangs as the tangs move around the discharge turn.

21. In a pick-up, an endless conveyor having an upper conveying reach, a lower return reach and a pick-up turn, means for moving the conveyor in a direction so that the tangs move in an upward direction about the pick-up turn, and a member for elevating material from the ground onto the tangs, the member being positioned to provide an upper surface substantially parallel to said upper conveying reach.

22. In a pick-up, an endless conveyor having an upper conveying reach, a lower return reach and a pick-up turn, means for moving the conveyor in a direction so that the tangs move in an upward direction about the pick-up turn, and a member for elevating material from the ground onto the tangs, the member being so positioned with respect to the tangs that at the position where the tangs reach the member in their upward movement, material is picked up and not kicked by the tangs.

ELMER PATTERSON.